United States Patent Office 2,723,258
Patented Nov. 8, 1955

---

2,723,258

POLYMERIZED ACRYLONITRILE COMPOSITIONS

John A. Price, Stamford, Conn., assignor to American Cyanamid Company, New York, N. Y., a corporation of Maine No Drawing. Application February 23, 1951,
Serial No. 212,523

1 Claim. (Cl. 260—80.5)

This invention relates to new and useful compositions of matter, and more particularly is concerned with polymerized acrylonitrile compositions. Still more particularly, the present invention is directed to particular products of polymerization of polymerizable compositions comprising (1) acrylonitrile and (2) a quaternary ammonium compound represented by the general formula

I              $[Z-R]^+, X^-$ where Z represents a tertiary amino grouping, R represents an ethylenically unsaturated hydrocarbon radical having a terminal

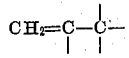

grouping and containing from 3 to 10 carbon atoms, inclusive, and $X^-$ represents an anion, the compound of (2) constituting from about 1% to about 15% by weight of the total amount of (1) and (2), e. g., a copolymer of a mixture containing acrylonitrile and a compound of the kind embraced by Formula I in a weight ratio of from about 1% to about 15% (more particularly from about 2% to about 10%) of the latter to from about 99% to about 85% (more particularly from about 98% to about 90%) of the former. The invention claimed in the instant application is directed specifically to a composition comprising a copolymer of (1) acrylonitrile, (2) allylpyridinium chloride and (3) methyl acrylate, said copolymer being obtained by copolymerizing a copolymerizable mixture containing, by weight, 69.75 parts of acrylonitrile, 3.75 parts of methyl acrylate and 1.5 parts of allylpyridinium chloride as the sole copolymerizable monomers thereof.

To the best of my knowledge and belief, the present invention is operative when Z in Formula I represents any tertiary amino grouping. Illustrative classes of tertiary amino groupings are trialiphatic (e. g., trialkyl, trialkenyl, trialkynyl, trialkenynyl, etc.) amino, tricycloaliphatic (e. g., tricycloalkyl, tricycloalkenyl, etc.) amino, tri-(aromatic-substituted aliphatic) (e. g., triaralkyl, triaralkenyl, etc.) amino, triaromatic (e. g., triphenyl, trixenyl, trinaphthyl, etc.) amino, tri-(aliphatic-substituted aromatic) amino, e. g., trialkylaryl, trialkenylaryl, etc., amino, monoaliphaticdiaromatic amino, monoaromaticdialiphatic amino, tri-(hydroxyaliphatic) amino, e. g., tri - (hydroxyalkyl) amino, tri - (hydroxycycloaliphatic) amino, e. g., tri-(hydroxycycloalkyl) amino, etc. More specific examples of tertiary amino groupings within these classes are the following:

Trimethyl amino to trioctadecyl amino, inclusive
Triallyl amino
Trimethallyl amino
Tricyclohexyl amino
Tricyclohexenyl amino
Tribenzyl amino
Triphenylallyl amino
Tritolyl amino
Tri-(allylphenyl) amino Monomethyldiphenyl amino
Monophenyldiethyl amino
Monobenzyldipropyl amino
Monotolyldibutyl amino
Monoallyldiethyl amino
Monoallylphenyldiamyl amino
Monophenylallyldihexyl amino
Monoethyldiallyl amino
Tri-(hydroxyethyl) amino
Tri-(hydroxypropyl) amino
Tri-(hydroxycyclohexyl) amino
Monoethyldi-(hydroxyethyl) amino
Mono-(hydroxypropyl)-diphenyl amino
Pyridyl
2-methylpyridyl
Quinolyl
Di-(hydroxyethyl) methyl amino
4-ethylmorpholino
Isoquinolyl
Mono-(hydoxyphenyl) dimethyl amino
Mono-(hydroxynaphthyl) diethyl amino
1-ethylpyrrolyl
1-methylpiperidyl
Cyanoethyldimethyl amino
1,4-dimethylpiperazyl
1,4-diallylpiperazyl
Pyrazyl Illustrative examples of radicals represented by R in Formula I are allyl ($CH_2=CH-CH_2-$), methallyl [$CH_2=C(CH_3)-CH_2-$ or $CH_2=CH-CH(CH_3)-$], ethallyl, propallyl, phenylallyl, tolylallyl, etc.

Illustrative examples of anions represented by $X^-$ in Formula I are the chloride, bromide, iodide, sulfate, sulfonate, phosphate, hydroxide, borate, cyanide, carbonate, hydrocarbonate, thiocyanate, thiosulfate, isocyanate, sulfite, bisulfite, nitrate, nitrite, oxalate, silicate, sulfide, cyanate, acetate and the other common inorganic and organic anions.

Specific examples of compounds embraced by Formula I are allyltrialkylammonium chlorides, (e. g., allyltriethylammonium chloride), allyltrialkylammonium bromide, (e. g., allyltriethylammonium bromide), allylpyridinium chloride, allylpyridinium bromide, methallylpyridinium chloride, allyldimethylphenylammonium bromide, allyl-bis - (2 - hydroxyethyl)methylammonium bromide and allyl-bis-(2-hydroxyethyl)methylammonium chloride.

The present invention has, as one of its main objects, the production of new acrylonitrile copolymer compositions which are more readily dyed, especially with acid dyes, than homopolymeric acrylonitrile or many of the copolymers of acrylonitrile and another monomer or monomers that were known or suggested prior to my invention.

Another object of the invention is to prepare such copolymers which can be spun or otherwise shaped to form filaments, tapes, ribbons, tubes, rods, sheets, etc., and the shaped articles then dyed either before or after having been oriented or treated to improve their useful properties.

Other objects of the invention will be apparent to those skilled in the art from the description and examples which follow.

These objects are accomplished, in general, by preparing a copolymer of ingredients comprising acrylonitrile and a compound or plurality of compounds of the kind embraced by Formula I as briefly described in the first paragraph of this specification and more fully hereafter. The copolymer advantageously is produced, for instance, by polymerizing in an aqueous medium, with the aid of a polymerization catalyst (or catalysts), a mixture of comonomers including acrylonitrile and a quaternary compound of the kind covered by Formula I, the latter constituting from about 1% to about 15%, more particularly from about 2 or 3% to about 10 or 12%, by weight of the total amount of quaternary ammonium compound and acrylonitrile employed; and, at the end of the polymerization period, isolating the resulting copolymer.

Any suitable method can be used in preparing the quaternary ammonium compounds embraced by Formula I and which are used in producing the new copolymer compositions of the present invention. A general procedure for the preparation of such compounds is as follows: Approximately equivalent amounts of an ethylenically unsaturated halide, specifically the chloride or bromide, and a tertiary amine are mixed in a flask along with an equal volume of an inert diluent or reaction medium, e. g., benzene. The reaction temperature varies in specific cases between, for example, 25° C. and 100° C. The time of reaction also varies in specific cases from, for instance, 0.5 to 10 hours. The precipitated quaternary ammonium compound is then isolated, as by filtration through a Büchner funnel, washed thoroughly with fresh benzene or other suitable solvent for any unreacted material, and dried, for instance under vacuum in a desiccator. The ethylenically unsaturated halide and tertiary amine employed as starting reactants correspond to the groupings desired in the quaternary ammonium compound.

Any suitable means may be used in effecting copolymerization of the quaternary ammonium compound with the acrylonitrile. Heat, light, or both heat and light, with or without a polymerization catalyst, can be used. A polymerization catalyst preferably is employed in order to shorten the period of time required for polymerization of the mixture of ingredients comprising acrylonitrile and quaternary ammonium compound. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl)peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide catalysts that can be employed are the following:

Tetralin hydroperoxide
Tert.-butyl diperphthalate
Cumene hydroperoxide
Tert.-butyl perbenzoate
2,4-dichlorobenzoyl peroxide
Urea peroxide
Caprylyl peroxide
p-Chlorobenzoyl peroxide
2,2-bis(tert.-butyl peroxy) butane
Hydroxyheptyl peroxide
Diperoxide of benzaldehyde Other so-called "free radical" types of catalysts, e. g., $\alpha,\alpha'$-azodiisobutyronitrile, also can be used to accelerate polymerization.

If desired, the mixture of monomers can be polymerized in emulsion or in solution state to yield a copolymer. Good results are obtained by effecting copolymerization while the monomers are dissolved in a suitable solvent, preferably water or a liquid solvent comprising mainly water. Suitable inert organic solvents also can be used if desired, e. g., benzene, toluene, xylene, etc. Preferably the copolymerization reaction is carried out in a liquid medium in which the monomeric mixture is soluble but the copolymer is insoluble, e. g., water.

The polymerization also can be effected by conventional bulk polymerization technique, in the presence or absence of a solvent capable of dissolving the monomeric mixture and in which the latter preferably is inert; or by conventional bead polymerization methods. The polymerization of the mixture of monomers can be effected by a continuous process as well as by a batch operation.

The concentration of the catalyst is relatively small, e. g., from, by weight, about 1 part of catalyst per 1000 parts of the monomeric mixture to about 3 or 4 parts of catalyst per 100 parts of the mixture of monomers.

The temperature of polymerization of the polymerizable composition comprising acrylonitrile and a quaternary ammonium compound of the kind embraced by Formula I, in the proportions specified in the first paragraph of this specification, can be varied over a wide range, up to and including or slightly above the boiling point (at atmospheric pressure) of the monomeric mixture. In most cases, the polymerization temperature will be within the range of about 20° or 30° C., preferably at least 35° or 40° C., up to the boiling temperature of the mixture of monomers, depending, for example, upon the particular catalyst, if any, used, the rapidity of polymerization wanted and other influencing factors. The use of polymerization temperatures substantially above the boiling point of the mixture of monomers is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

If desired, the monomers may be copolymerized in the presence of a plasticizer for the copolymer in a manner similar to that disclosed and claimed in the copending application of Walter M. Thomas, Serial No. 780,309, filed October 16, 1947, now Patent No. 2,558,396 dated June 26, 1951. Other copolymerization methods, however, also may be employed, e. g., methods such as those described in U. S. Patents 2,140,048, 2,160,054, 2,194,354, 2,333,635, 2,436,926, and British Patent 586,881 with reference to the production of other polymerization products. The copolymers of ingredients comprising combined acrylonitrile and quaternary ammonium compound may be produced in various molecular weights, depending, for instance, upon the particular polymerization conditions employed but ordinarily are within the range of about 15,000 to about 300,000 or higher as calculated from viscosity measurements using the Staudinger equation (reference: U. S. Patent No. 2,404,713).

If the copolymerization reaction is carried out while the mixed monomers are dissolved or dispersed in a liquid medium, e. g., in solution in water, the resulting copolymer then is separated from the said medium by any suitable means, e. g., by filtration, centrifuging, solvent extraction, etc.

The following examples are illustrative of the preparation of quaternary ammonium compounds that can be used in practicing the present invention.

Example 1

A reaction vessel was charged with 12 parts of allyl bromide and 10 parts of triethylamine dissolved in 16 parts of benzene. The solution was allowed to stand for about 16 hours at 20°–25° C. A white, crystalline product comprising allyltriethylammonium bromide slowly precipitated. This product was collected on a Büchner funnel, washed with benzene and dried in a vacuum desiccator. Eighteen parts of dry product was obtained.

Example 2

A reaction vessel was charged with 10 parts of allyl chloride and 10 parts of pyridine, and the solution was refluxed for 6 hours. The resulting tan-colored solid comprising allylpyridinium chloride was collected on a Büchner funnel, washed with benzene and dried in a vacuum desiccator. Sixteen parts of dry product was obtained.

Example 3

A reaction vessel was charged with 12 parts of allyl bromide and 8 parts of pyridine dissolved in 20 parts of benzene. Although the reaction was apparently complete at the end of 3 hours, it was allowed to stand for 3 days at 20°–25° C. A tan-colored crystalline product comprising allylpyridinium bromide slowly precipitated. The product was collected, washed and dried in the same manner as in Example 1. Seventeen parts of dry product was obtained.

Example 4

A reaction vessel was charged with 25 parts of allyl chloride and 30 parts of triethylamine. The solution was refluxed on a steam bath for 10 hours. A cream-colored crystalline product comprising allyltriethylammonium chloride slowly precipitated. The product was collected, washed and dried in the same manner as in Example 1. Nine parts of dry product was obtained.

Example 5

A reaction vessel was charged with 10 parts of methallyl chloride and 10 parts of pyridine. The solution was refluxed on a steam bath for 30 minutes. A tan, crystalline solid comprising methallylpyridinium chloride precipitated. It was collected, washed and dried in the same manner as in Example 1. Eleven parts of dry product was obtained.

Example 6

A reaction vessel was charged with 10 parts of allyl bromide and 10 parts of N,N-dimethylaniline. Although the reaction was apparently complete at the end of 2 hours, it was allowed to stand for 16 hours at 20°–25° C. A cream-colored crystalline product comprising allyldimethylphenylammonium chloride slowly precipitated. It was collected, washed and dried in the same manner as in Example 1. Eighteen parts of dry product was obtained.

Example 7

A reaction vessel was charged with 10 parts of allyl bromide and 10 parts of bis-(2-hydroxyethyl)methylamine dissolved in 20 parts of benzene. The reaction appeared to be complete at the end of ten minutes. The product was a benzene-insoluble oil. It was washed once with 20 parts of fresh benzene and then crystallized by freezing in a "Dry Ice" bath. The light, cream-colored solid comprising allyl - bis - (2 - hydroxyethyl)methylammonium bromide was collected, washed and dried in the same manner as in Example 1. Fifteen parts of dry product was obtained.

Example 8

A reaction vessel was charged with 8 parts of allyl chloride and 10 parts of bis-(2-hydroxyethyl)methylamine, and the solution was allowed to stand for 4 hours at 25° C. A benzene-insoluble oil formed. It was crystallized in the same manner as in Example 7. The light, cream-colored solid comprising allyl-bis-(2-hydroxyethyl)methylammonium chloride was collected, washed and dried in the same manner as in Example 1. Eighteen parts of dry product was obtained.

In order that those skilled in the art may better understand how the present invention can be carried into effect, the following examples are given by way of illustration and not by way of limitation. All parts and percentages are by weight.

Example 9

This example illustrates the preparation of homopolymeric acrylonitrile, which was subsequently employed in comparative tests with the copolymers of the present invention.

A reaction vessel, equipped with a stirrer, reflux condenser, thermometer and gas-inlet tube, was placed in a constant-temperature bath which was maintained at 35° C. To the vessel was added a solution of 53.0 parts of acrylonitrile, 900 parts of distilled water and 0.29 part of sulfuric acid. A rapid stream of pre-purified nitrogen was passed over the surface of the solution for 30 minutes. The nitrogen flow was then reduced to about one bubble per second. A reduction-oxidation catalyst system ("redox" system) consisting of 1.71 parts of ammonium persulfate and 0.71 part of sodium meta-bisulfite, each dissolved in 50 parts of water, was then added. The solution first became cloudy at the end of 3 minutes, and the polymerization was fairly exothermic for the first half hour. The polymerization was continued for a total of 4 hours at 35° C. The pH of the reaction product was 3.1. The polymer was collected on a Büchner funnel, washed with 1000 parts of distilled water followed by about 160 parts of methanol. The polymer was dried in an oven at 70° C. for about 16 hours. The yield of dry polyacrylonitrile, which was white, amounted to 48 parts.

Example 10

A reaction vessel, equipped with a stirrer, reflux condenser, thermometer, and gas-inlet tube, was placed in a constant temperature bath which was maintained at 65°–70° C. To the vessel was added a solution of 71.2 parts of acrylonitrile, 3.75 parts of allyltriethylammonium bromide, 1000 parts of distilled water and 0.006 part of sodium hydroxide. The pH of this solution was 9.2. A rapid stream of pre-purified nitrogen gas was passed over the surface of the solution for 30 minutes. The nitrogen flow was then reduced to about one bubble per second. To the vessel was then added 1.5 parts of $\alpha,\alpha'$ - azodiisobutyronitrile. The solution first became cloudy at the end of 3 minutes. The polymerization was continued for a total of 3 hours at 65°–70° C. The copolymer was collected on a Büchner funnel, washed with 2000 parts of distilled water and was dried in an oven at 70° C. for about 16 hours. The yield of dry copolymer which was white, amounted to 59 parts.

Example 11

To a reaction vessel, equipped as in Example 10, was added a solution of 47.7 parts of acrylonitrile, 5.3 parts of allyltriethylammonium bromide and 900 parts of distilled water. The pH of this solution was 4.6. A rapid stream of pre-purified nitrogen gas was passed over the surface of the solution for 30 minutes. The nitrogen flow was then reduced to about one bubble per second. To the vessel was then added 1.71 parts of ammonium persulfate and 0.71 part of sodium bisulfite (meta) each dissolved in 50 parts of water. The polymerization was carried out for 4 hours at 35° C. The copolymer was collected on a Büchner funnel, washed with 2000 parts of distilled water and was dried in an oven at 70° C. for about 16 hours. The yield of dry, white copolymer amounted to 43 parts.

*Example 12*

Essentially the same conditions and procedure were employed as in Example 10 with the exception that the allyltriethylammonium bromide was replaced with an equal weight of allyltriethylammonium chloride and the polymerization time was 5 hours. The yield of dry copolymer, which was cream-colored, amounted to 52 parts.

*Example 13*

In this example, too, the conditions and procedure were essentially the same as in Example 10 with the exception that the allyltriethylammonium bromide was replaced with an equal weight of allylpyridinium chloride and the polymerization time was 4 hours. The yield of dry, cream-colored copolymer amounted to 36 parts.

*Example 14*

To a reaction vessel, equipped as in Example 10, was added a solution of 50.3 parts of acrylonitrile, 2.65 parts of allylpyridinium bromide, 1000 parts of distilled water and 0.008 part of sodium hydroxide. The pH of this solution was 8.7. A rapid stream of pre-purified nitrogen gas was passed over the surface of the solution for 30 minutes. The nitrogen flow was then reduced to about one bubble per second. To the vessel was then added 1.5 parts of $\alpha,\alpha'$-azodiisobutyronitrile (polymerization catalyst). The polymerization was run for a total of 4 hours at 65°–70° C. The copolymer was collected on a Büchner funnel, washed with 1000 parts of distilled water and was dried in an oven at 70° C. for about 16 hours. The yield of dry, cream-colored copolymer amounted to 25 parts.

*Example 15*

Essentially the same conditions and procedure were employed as in Example 10 with the exception that the allyltriethylammonium bromide was replaced with an equal weight of methallylpyridinium chloride and the polymerization time was 4 hours. The yield of dry copolymer, which was cream-colored, amounted to 23 parts.

*Example 16*

To a reaction vessel, equipped as in Example 10, was added a solution of 67.5 parts of acrylonitrile, 7.5 parts of allyldimethylphenylammonium bromide, 1000 parts of distilled water and 0.014 part of sodium hydroxide. The pH of this solution was 9.6. A rapid stream of pre-purified nitrogen gas was passed over the surface of the solution for 30 minutes. The nitrogen flow was then reduced to about one bubble per second. To the vessel was then added 1.9 parts of $\alpha,\alpha'$-azodiisobutyronitrile. The polymerization was carried out for a total of 4 hours at 65°–70° C. The copolymer was collected on a Büchner funnel, washed with 1000 parts of distilled water and was dried in an oven at 70° C. for about 16 hours. The yield of dry, white copolymer amounted to 32 parts.

*Example 17*

Essentially the same conditions and procedure were employed as in Example 10 with the exception that the allyltriethylammonium bromide was replaced with an equal weight of allyl-bis-(2-hydroxyethyl)methylammonium bromide and the polymerization time was 4 hours. The yield of dry copolymer, which was cream-colored, amounted to 56 parts.

*Example 18*

To a reaction vessel, equipped as in Example 10, was added a solution of 50.35 parts of acrylonitrile and 2.65 parts of allyl-bis-(2-hydroxyethyl)methylammonium chloride and 800 parts of distilled water. The pH of the solution was 9.1. A rapid stream of pre-purified nitrogen gas was passed over the surface of the solution for 30 minutes. The nitrogen flow was then reduced to about one bubble per second. To the vessel was then added 2.5 parts of 60% methyl ethyl ketone peroxide (dissolved in dimethylphthalate and 0.1 part of 6% cobalt as cobalt naphthenate). The polymerization was run for a total of 4 hours at 65°–70° C. The copolymer was collected on a Büchner funnel, washed with 2000 parts of distilled water and was dried in an oven at 70° C. for about 16 hours. The yield of dry, white copolymer amounted to 31 parts.

*Example 19*

To a reaction vessel, equipped as in Example 10, was added a solution of 69.75 parts of acrylonitrile, 3.75 parts of methyl acrylate, 1.5 parts of allylpyridinium chloride, 1000 parts of distilled water, and 0.008 part of sodium hydroxide. The pH of this solution was 9.4. The polymerization, isolation, washing and drying of the product were carried out in the same manner as in Example 10. The yield of dry, white copolymer amounted to 46 parts.

*Example 20*

Samples of the homopolymeric acrylonitrile of Example 9 and of the copolymers of Examples 10 to 19, inclusive, were subjected to the following dye test:

A sample (5 parts) of the dry polymer or copolymer was added to a dye bath consisting of 500 parts of an aqueous solution containing 0.2 part of concentrated sulfuric acid, 1 part of sodium sulfate and 0.2 part of Calcocid Alizarine Blue SAPG (Color Inex No. 1054). The dye bath was boiled for 30 minutes, after which the polymerization product was filtered off and washed with hot water until the water was free of dye. The copolymers of Examples 10 to 19, inclusive, were dyed blue, whereas the homopolymeric acrylonitrile of Example 9 failed to absorb any dye. The advantage of modifying an acrylonitrile polymerization product by replacing a part (e. g., from about 1% to about 15% or more, still more particularly from 2 or 3% to 8 or 10%) of the initial acrylonitrile with a quaternary ammonium compound of the kind embraced by Formula I, thereby to obtain a copolymeric acrylonitrile substance of improved dyeability, is therefore quite apparent.

It will be understood, of course, by those skilled in the art that my invention is not limited to the specific ingredients named in the above illustrative examples nor to the particular proportions and methods of copolymerization mentioned therein. Thus, instead of $\alpha,\alpha'$-azodiisobutyronitrile and the reduction-oxidation (redox) catalyst system named in the different examples, any other polymerization catalyst or combination of polymerization catalysts, numerous examples of which have been given hereinbefore, can be used. Other catalysts and redox-catalyst systems that can be employed are given, for example, in the copending application of Arthur Cresswell, Serial No. 76,667, filed February 15, 1949, now abandoned, and in the various patents mentioned therein.

Likewise, various modifying comonomers, in addition to the methyl acrylate named in Example 19, can be used. Illustrative examples of such comonomers are vinyl compounds which are different from acrylonitrile (vinyl cyanide), including the vinyl aromatic compounds, more particularly the vinyl aromatic hydrocarbons (e. g., styrene, isopropenyl toluene, the various dialkyl styrenes, etc.), other aliphatic compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

The proportions of any modifying comonomer or comonomers that are incorporated in the polymerizable composition together with the acrylonitrile and quaternary ammonium compound of the kind embraced by Formula I can be varied as desired or as conditions may require. Ordinarily, however, the acrylonitrile constitutes a major or preponderant proportion (more than 50%) by weight of the total weight of monomers to be copolymerized, the quaternary ammonium compound constitutes from about 1% to about 15% of the total weight of the acrylonitrile and quaternary ammonium compound, and any modifying comonomer or comonomers (if present in the polymerizable mixture) constitute the remainder of the total amount of comonomers which are subjected to copolymerization.

In the preferred copolymer compositions (more particularly thermoplastic copolymer compositions) of the present invention, the acrylonitrile is employed in the mixture of comonomers in an amount such that at least 85% by weight of combined acrylonitrile is present in the copolymer. When the polymerization rates of the acrylonitrile and additional monomer or monomers are different from each other, then it may be necessary to start with an amount of acrylonitrile either more or less than 85% by weight of the total mixture of monomers in order that the final copolymer will contain at least 85% by weight of combined acrylonitrile in the copolymer molecule. Similarly, in order that the finished copolymer shall contain, in the copolymer molecule, from about 1% to about 15% by weight of combined quaternary ammonium compound of the kind covered by Formula I, preferably between about 2 or 3% and about 10% by weight of such combined compound, it may be necessary to start with an amount of quaternary ammonium compound either more or less than that which is present in the finished copolymer in order that the said copolymer will have the ultimate composition desired or required in order to impart optimum dye receptivity thereto.

Although the new copolymers of this invention are particularly useful in the formation of fibers or filaments which are more amenable to dyeing than homopolymeric acrylonitrile, they also have numerous other applications in the plastics and coating arts. For instance, with or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molded compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of my invention can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

Fibers can be produced from the copolymers of the present invention in the manner described in, for example, the copending application of Arthur Cresswell, Serial No. 76,668 filed February 15, 1949, now U. S. Patent No. 2,644,803 with particular reference to the production of a molecularly oriented fiber from a copolymer of acrylonitrile and allyl alcohol. The unoriented and oriented fibers produced from my new copolymers are readily dyed, especially with an acid dye, while the fiber is in either a gel (e. g., aquagel) or a dry state.

In a manner similar to that described hereinbefore, valuable copolymer compositions can be prepared by copolymerization of (1) acrylonitrile and (2) one or more vinyl (including certain substituted vinyl) quaternary ammonium salts wherein the latter constitutes, for example (especially when the copolymer is to be used in producing a fiber of improved dyeability), from about 1% to about 15% by weight of the total amount of (1) and (2). Such quaternary ammonium salts are those which can be represented by the general formula II 

where Z and X⁻ have the same meanings given above with reference to Formula I (that is, Z represents a tertiary amino grouping and X⁻ represents an anion), and R represents a member of the class consisting of hydrogen and monovalent hydrocarbon radicals. Examples of monovalent hydrocarbon radicals represented by R in Formula II are aliphatic (e. g., methyl, ethyl, propyl, isopropyl, butyl, isobutyl, sec.-butyl, butenyl, butynyl, amyl, isoamyl, hexyl, octyl, decyl, dodecyl, hexadecyl, octadecyl, allyl, methallyl, crotyl, oleyl, linalyl, etc.), including cycloaliphatic (e. g., cyclopentyl, cyclopentenyl, cyclohexyl, cyclohexenyl, cycloheptyl, etc.); aromatic e. g., phenyl, biphenylyl or xenyl, naphthyl, etc.); aliphatic-substituted aromatic (e. g., tolyl, xylyl, ethylphenyl, 2-butenylphenyl, tert.-butylphenyl, etc.); and aromatic-substituted aliphatic (e. g., benzyl, cinnamyl, phenylethyl, tolylethyl, phenylpropyl, phenylallyl, etc.).

I claim:

A composition comprising a copolymer of (1) acrylonitrile, (2) allylpyridinium chloride and (3) methyl acrylate, said copolymer being obtained by copolymerizing a copolymerizable mixture containing, by weight, 69.75 parts of acrylonitrile, 3.75 parts of methyl acrylate and 1.5 parts of allylpyridinium chloride as the sole copolymerizable monomers thereof.

References Cited in the file of this patent

UNITED STATES PATENTS

| | | |
|---|---|---|
| 2,491,471 | Arnold | Dec. 20, 1949 |
| 2,662,877 | Chaney | Dec. 15, 1953 |